United States Patent [19]
Ishii

[11] Patent Number: 4,564,221
[45] Date of Patent: Jan. 14, 1986

[54] HOSE COUPLING

[75] Inventor: Hidesaburo Ishii, Tokyo, Japan

[73] Assignee: Chiyoda Tsusho K.K., Tokyo, Japan

[21] Appl. No.: 588,250

[22] Filed: Mar. 12, 1984

[30] Foreign Application Priority Data

Mar. 26, 1983 [JP] Japan .............................. 58-043914[U]

[51] Int. Cl.$^4$ ............................................. F16L 33/22
[52] U.S. Cl. ................... 285/239; 285/315; 285/321
[58] Field of Search ............... 285/308, 321, 315, 340, 285/239, 238

[56] References Cited

U.S. PATENT DOCUMENTS

| | | | |
|---|---|---|---|
| 4,113,287 | 9/1978 | Bogatirev | 285/321 X |
| 4,123,090 | 10/1978 | Kotsakis | 285/340 X |
| 4,298,220 | 11/1981 | Kukuminato | 285/308 X |

Primary Examiner—Dave W. Arola
Attorney, Agent, or Firm—Oblon, Fisher, Spivak, McClelland & Maier

[57] ABSTRACT

A hose coupling of a simple construction is disclosed which is capable of attaining airtight or watertight connection of a hose to a coupling body, effective prevention of disconnection of the hose therefrom in use, and disconnection of the hose therefrom at the time of exchange.

The hose coupling includes an O-ring, a holding ring for securely holding a hose to the coupling, and a collar for releasing engagement between the hose and the coupling which are arranged in a fluid passage of the coupling. The holding ring and collar are held in position by means of expansion spring rings.

3 Claims, 5 Drawing Figures

HOSE COUPLING

BACKGROUND OF THE INVENTION

1. Field of the Invention

This invention relates to a hose coupling, and more particularly to a hose coupling of a simple construction which is adapted to readily accomplish not only airtight or watertight connection of a hose to a coupling body and effective prevention of disconnection of the hose therefrom by merely inserting one end of the hose into the coupling body but disconnection of the hose from the coupling body by merely manually pressing a flange of a collar fitted in the coupling body.

2. Description of the Prior Art

There have been conventionally proposed and practiced many kinds of hose couplings. However, the conventional hose couplings each are not adapted to readily attain airtight or watertight connection of a hose to the coupling and disconnection of the hose therefrom with a simple construction. Also, in the prior art hose coupling, the prevention of disconnection of the hose from the coupling has rendered the construction and operation more complicated. This causes the manufacturing costs to be significantly increased.

Accordingly, it would be highly desirable in the art to develop a hose coupling which is capable of effectively exhibiting such function as described above with a simple construction and being readily operated.

SUMMARY OF THE INVENTION

The present invention has been made in view of the foregoing disadvantage of the prior art.

Accordingly, it is an object of the present invention to provide a hose coupling of a simple construction which is capable of readily carrying out not only airtight or watertight connection of a hose to a coupling body and effective prevention of disconnection of the hose therefrom in use but disconnection of the hose from the coupling body at the time of exchange, with a simple operation.

It is another object of the present invention to provide a hose coupling which is capable of substantially reducing the manufacturing costs.

It is a further object of the present invention to provide a hose coupling suitable for use for various kinds of hoses including flexible plastic and metal hoses.

It is still a further object of the present invention to provide a hose coupling having a mechanism for connecting and disconnecting a hose with respect to the coupling incorporated therein.

In accordance with the present invention, there is provided a hose coupling comprising a coupling body having a fluid passage formed therethrough; an O-ring fitted in said fluid passage of said coupling body, said O-ring being in close contact with a hose inserted into said fluid passage to airtightly or watertightly hold said hose with respect to said coupling body; a holding ring fitted in said fluid passage of said coupling body behind said O-ring, said holding ring being tapered at the outer and inner surfaces thereof and formed with a cut to provide a gap therein; a first expansion spring ring fitted in said fluid passage of said coupling body to prevent disconnection of said holding ring from said coupling body; a collar fitted in said passage of said coupling body behind said holding ring which has a slope and a flange respectively formed at the forward and rear ends thereof, said collar being arranged in a manner such that said flange projects from said fluid passage; and a second expansion spring ring fitted in said fluid passage of said coupling body to prevent disconnection of said collar from said coupling body.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate the same parts throughout and wherein.

DETAILED DESCRIPTION OF THE PREFERRED EMBODIMENT

A hose coupling according to the present invention will be described hereinafter with reference to the accompanying drawings.

Figure 1:
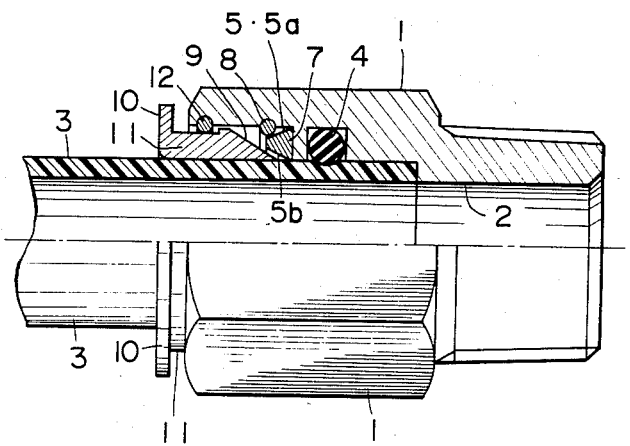
FIG. 1 is an elevational view partly in section illustrating an embodiment of a hose coupling according to the present invention.
Figure 2:
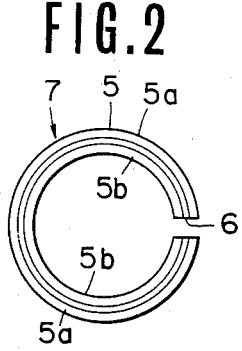
FIG. 2 is a front view of a holding ring employed in the hose coupling shown in FIG. 1.
Figure 3:
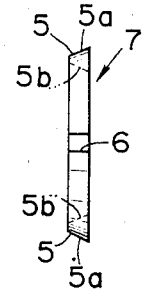
FIG. 3 is a side view of the holding ring shown in FIG. 2.
Figure 4:
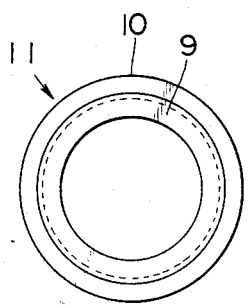
FIG. 4 is a front view of a collar employed in the hose coupling shown in FIG. 1.
Figure 5:
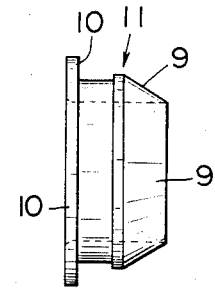
FIG. 5 is a side view of the collar shown in FIG. 4.

Referring to FIG. 1 illustrating an embodiment of a hose coupling according to the present invention, the hose coupling of the embodiment includes a coupling body 1 formed therethrough with a fluid passage 2. The fluid passage 2 has an O-ring 4 fitted therein, which is adapted to be in close contact with the outer peripheral surface of a hose 3 inserted into the coupling body 1 to keep the hose 3 in an airtight or watertight relationship to the coupling body 1. The coupling body 1 is also fitted therein a holding ring 7 formed with a taper 5 at the outer and inner surfaces 5a and 5b thereof are formed with a cut 6 to provide a gap therein as shown in FIGS. 2 and 3 and an expansion spring ring 8 for preventing disconnection of the holding ring from the coupling body, in order behind the O-ring 4. Further, the coupling body 1 has a collar 11 and an expansion spring ring 12 fitted therein. The expansion spring ring 12 acts to prevent disconnection of the collar 11 from the coupling body 1. The collar 11 has a slope 9 and a flange 10 formed at the forward and rear ends thereof, respectively, as shown in FIGS. 4 and 5.

In the illustrated embodiment, the O-ring 4 and expansion spring rings 8 and 12 are securely fitted in grooves circumferentially formed on the surface of the fluid passage 2 to prevent the dislocation. The expansion spring rings 8 and 12 each are fixedly held in the grooves due to its outward expansion spring action, and serve to prevent the holding ring 7 and collar 11 from being dislocated from the flow passage 2 and allow the ring 7 and collar 11 to be supported in the fluid passage in a manner to be loosely fitted therein. The collar 11 is partially inserted into the coupling body 1 to permit the flange 10 to be positioned at the outside of the coupling body 1.

The holding ring 7, as described above, is formed with the cut portion 6 of a given gap, resulting in being elastically expandable, which is clearly shown in FIGS. 2 and 3. Thus, it will be noted that the widening of gap of the cut portion 6 to enlarge the diameter of the ring 7 permits the fitting and removing of the hose 3 with respect to the coupling body 1, and the narrowing of the space to reduce the diameter allows the hose 3 to be securely held in the coupling body 1 to be positively prevented from disconnecting from the coupling body 1.

The manner of operation of the hose coupling constructed in the manner as described above will be hereinafter described with reference to the drawings.

First, the connection of the hose 3 with respect to the hose coupling 1 is accomplished by inserting one end of the hose 3 through the collar 11, holding ring 7 and O-ring 4 into the fluid passage 2 of the coupling body 1. When force is applied to the connected hose 3 in the direction of removing it from the coupling body 1, the holding ring 7 securely bites into or engages with the outer peripheral surface of the hose 3 to restrain the hose from being disconnected from the coupling body 1, because the expansion spring ring 8 fixedly held in the fluid passage 2 pressedly abuts the tapered outer surface 5a of the holding ring 7 to allow the gap of the cut portion 6 or the diameter of the ring 7 to be reduced.

The disconnection of the hose 3 from the hose coupling which is desired for the purpose of exchange or the like can be readily carried out only by forward pushing the collar 11 through the flange 10. When the flange 10 is pushed, the sloping end portion 9 of the flange contactingly enters the lower surface 5b of the tapered portion 5 of the holding ring 7 to apply to the holding ring 7 force which acts to widen the gap of the cut portion 6 to enlarge the diameter of the ring 7, so that the ring 7 may be separated from the outer periphery surface of the hose 3, resulting in the hose being readily removed from the hose coupling.

As can be seen from the foregoing, the hose coupling according to the present invention readily attains secure connection of a hose thereto and the prevention of disconnecting of the hose therefrom by merely inserting the hose into the coupling body as well as disconnection of the hose therefrom by merely forward pushing the flange of the collar. Thus, it will be noted that the present invention is applicable to various types of fluid hoses.

While a preferred embodiment of the invention has been described with a certain degree of particularity, obvious modifications and variations are possible in light of the above teachings. It is therefore to be understood that within the scope of the appended claims, the invention may be practiced otherwise than as specifically described.

What is claimed is:

1. A hose coupling comprising:
 (a) a coupling body having a fluid passageway formed therethrough, said fluid passageway having a first end into which a hose is introduced during use of the coupling and a second end opposite to the first end, said fluid passageway:
   (i) having a circular cross-section throughout its length;
   (ii) having a first diameter from its second end to a first annular shoulder which, during use of the coupling, abuts the end of the hose to define the axial position of the hose in said fluid passageway;
   (iii) having a second diameter, larger than the first diameter, from said first annular shoulder to a second annular shoulder; and
   (iv) having a third diameter, larger than the second diameter, from said second annular shoulder to the first end of said fluid passageway;
 (b) an O-ring fitted in a first annular groove in the surface of said fluid passageway between said first and second annular shoulder, said O-ring being sized and shaped so that, during use of the coupling, it makes sealing contact with said coupling body and with the exterior surface of the hose;
 (c) a radially expandable holding ring fitted in said fluid passageway in abutment with said second annular shoulder, said holding ring:
   (i) having a radial gap therethrough which permits it to flx radially inwardly or radially outwardly;
   (ii) having a first radial surface which abuts said second annular shoulder;
   (iii) having a second radial surface which is narrower than said first radial surface;
   (iv) having a tapered annular internal camming surface extending from the inner edge of said first radial surface to the inner edge of said second radial surface;
   (v) having a tapered annular external camming surface extending from the outer edge of said first radial surface to the outer edge of said second radial surface; and
   (vi) having inherent resiliency which biases said holding ring towards a shape in which said radial gap has a predetermined circumferential width;
 (d) a first expansion ring fitted in a second annular groove in the surface of said fluid passageway, said first expansion ring being sized, shaped, and positioned to bear against said tapered annular external camming surface on said holding ring, whereby if, during use of the coupling, an attempt is made to withdraw the hose without first expanding said holding ring, the movement of the hose causes said holding ring to move axially against said first expansion ring and the contact of said first expansion ring with said tapered annular external camming surface on said holding ring causes said holding ring to be forced radially inwardly, thereby digging into the exterior of the hose;
 (e) an axially movable collar fitted in said fluid passageway, said collar:
   (i) having a circular inner bore sized to allow the hose to pass therethrough during use of the coupling and to permit ready axial movement of said collar relative to the hose;
   (ii) having a tapered annular external camming surface sized, shaped, and positioned to make camming contact with the tapered annular internal camming surface on said radially expandable holding ring;
   (iii) projecting axially outwardly of the first end of said fluid passageway over the full extent of the axial travel of said axially movable collar; and
   (iv) having a third annular shoulder facing toward the first end of said fluid passageway; and
 (f) a second expansion ring fitted in a third annular groove in the surface of said fluid passageway, said second expansion ring being sized, shaped, and positioned to abut against said third annular shoulder on said axially movable collar and to thereby limit axial movement of said collar toward the first end of said fluid passageway.

2. A hose coupling as recited in claim 1 wherein said first expansion ring bears against said holding ring at all times, preventing axial movement of said holding ring.

3. A hose coupling as recited in claim 1 wherein said axially movable collar also has a flange which projects radially outwardly of the first end of said fluid passageway and which is manually manipulatable over the full range of axial travel of said axially movable collar.

* * * * *